United States Patent [19]

Spilsbury

[11] 4,281,272

[45] Jul. 28, 1981

[54] HIGH VOLTAGE SWITCHING POWER SUPPLY FOR PENETRATION CATHODE RAY DISPLAYS

[75] Inventor: Thomas W. Spilsbury, Phoenix, Ariz.

[73] Assignee: Sperry Corporation, New York, N.Y.

[21] Appl. No.: 113,902

[22] Filed: Jan. 21, 1980

[51] Int. Cl.³ .................... H01J 23/34; H04N 9/27
[52] U.S. Cl. ..................................... 315/1; 315/375; 358/72; 358/73
[58] Field of Search ............... 315/1, 375; 358/72, 358/73; 340/720

[56] References Cited

U.S. PATENT DOCUMENTS

| | | | |
|---|---|---|---|
| 3,939,377 | 2/1976 | Ignasiak | 313/468 |
| 3,946,267 | 3/1976 | Lustig et al. | 313/473 |
| 4,071,640 | 1/1978 | Ignasiak | 427/215 |
| 4,104,564 | 8/1978 | Cohen et al. | 358/73 |
| 4,203,055 | 5/1980 | Chambers et al. | 315/375 |

Primary Examiner—Harold A. Dixon
Attorney, Agent, or Firm—Howard P. Terry

[57] ABSTRACT

An efficient switching power supply provides power for penetration phosphor cathode ray tube color displays employing rapidly selectable high voltages for anode or acceleration electrodes. The apparatus employs a serially connected command decoder, a voltage regulator, a power oscillator, and a voltage multiplier along with an output voltage divider for supplying a fed back voltage to the regulator for comparison purposes. Positive transitions of the high voltage output are directly accomplished in the power oscillator-voltage multiplier serving as a unidirectional voltage to unidirectional voltage converter. The apparatus is further supplied with a signal lever detector responsive to the voltage regulator and employing a switching oscillator to control the conductivity state of a pull down switch coupled in shunt with respect to the anode voltage line. Negative transitions of the high voltage output are controlled by turning off the power oscillator and by pulling the output voltage down by making the pull down switch conductive.

5 Claims, 3 Drawing Figures

HIGH VOLTAGE SWITCHING POWER SUPPLY FOR PENETRATION CATHODE RAY DISPLAYS

BACKGROUND OF THE INVENTION

1. Field of the Invention

The invention relates to cathode ray tube displays and more particularly to cathode ray displays of the phosphor penetration type employing rapidly selectable high anode or acceleration voltages for providing improved color displays.

2. Description of the Prior Art

Penetration phosphor cathode ray tubes of several types are known in the art and are attractive for use in specialized displays wherein their bright color producing capabilities permit the presentation of complex data in semi-pictorial forms quickly interpretable by the viewer. They are additionally attractive for use in such information displays, including displays for air traffic control, navigation, radar, and the like systems, because they provide images with high resolution and good contrast, even in the central portion of the viewing screen.

The conventional penetration phosphor cathode ray tube in its most prevalent form has a viewing screen which uses controlled penetration of electrons into a series of phosphor layers for producing therein light of a corresponding series of colors. For example, the screen may include two or more different phosphor layers, each very thin, uniform, and separated by a transparent dielectric layer. When the electron beam is driven by a relatively low voltage, the energy of the electrons is not sufficient to penetrate the dielectric barrier layer; only the phosphor of the first layer is excited and only its color is produced. At higher electron beam voltages and correspondingly higher electron energies, the phosphors of both of the first and second layers are excited, the intensity of the color contribution by the second layer phosphor increasing as the electron beam energy is increased.

Full use may be made of the penetration phosphor characteristics in providing a variable color display while using only one electron beam simply by controlling the voltage on the beam acceleration electrode adjacent the focusing electrode. With red and green emitting phosphors, successive changes in the beam acceleration voltage generate distinct colors; for example, red, orange, yellow, or green may thus be generated. Only one suitably controlled electron gun is required and the apertured masks of prior art color television tubes are eliminated along with other features undesirable for use in fast high resolution information displays. A further understanding of the construction and operation of penetration phosphor displays is found in the following Sperry Corporation U.S. patents: S. F. Ignasiak, U.S. Pat. No. 3,939,377 for "Penetration Phosphors and Display Devices", issued Feb. 17, 1976, C. D. Lustig, J. B. Thaxter, U.S. Pat. No. 3,946,267 for "Plural Filter System Cooperating With Cathode Ray Display with Lanthanum Host Phosphor Emissive in Two Colors", issued Mar. 23, 1976, and S. F. Ignasiak, U.S. Pat. No. 4,071,640 for "Penetration Phosphors for Display Devices", issued Jan. 31, 1978.

Various techniques are found in the prior art for selectively switching the color of successive cathode ray traces on such phosphor screens from one color to another. Since such operations necessarily involve the difficult problem of switching of high anode or acceleration voltages, great care must be taken not to compound the already difficult situation by making non-constructive design choices. For example, an anode power supply which appears on its face to be simple, uses a series regulator triode in the anode voltage line and a second triode allowing the discharge of the effective capacitance of the cathode ray anode or accelerating electrode to ground. The effective capacitance to be discharged may be as high as 500 picofarads for a shielded cathode ray tube, so that considerable power must be dissipated.

Where much shorter switching times are desired and much lower power dissipation, as is often the case in airborne displays, switching power supplies have been proposed that consist of a relatively slow switching shunt triode connected in parallel with a fast switching device employing two sequentially operating pulse transformers with controlling drive circuits permitting anode voltage rise and fall times to be considerably reduced. However, even the latter arrangement lacks suitability since the two pulse transformers are large and heavy. Furthermore, the prior art supply does not generally lend itself to construction in a compact, efficient, stable, and trouble-free form.

SUMMARY OF THE INVENTION

The present invention provides an efficient switching power supply for penetration phosphor cathode ray tube color displays employing rapidly selectable high voltages for anode or acceleration electrodes. The apparatus employs a serially connected command decoder, a voltage regulator, a power oscillator, and an energy storing a voltage multiplier along with an output voltage divider for supplying a fed back voltage to the regulator for comparison purposes. Positive or pull-up transitions of the high voltage output are directly accomplished by the power oscillator-voltage multiplier serving as a high speed unidirectional voltage to unidirectional voltage converter. The apparatus is further supplied with a signal level detector responsive to the voltage regulator and employing a switching oscillator to control the conductivity state of a pull down switch coupled in shunt with respect to the anode voltage line. Negative or pull down transitions of the high voltage output are controlled by turning off the power oscillator and by pulling the output voltage down by making the pull down switch conductive while after pull-down the voltage multiplier means substantially reestablishes the initial anode voltage through its energy storage capacitors thereby eliminating the requirement of pull-up switches.

DESCRIPTION OF THE PREFERRED EMBODIMENTS

Figure 1:
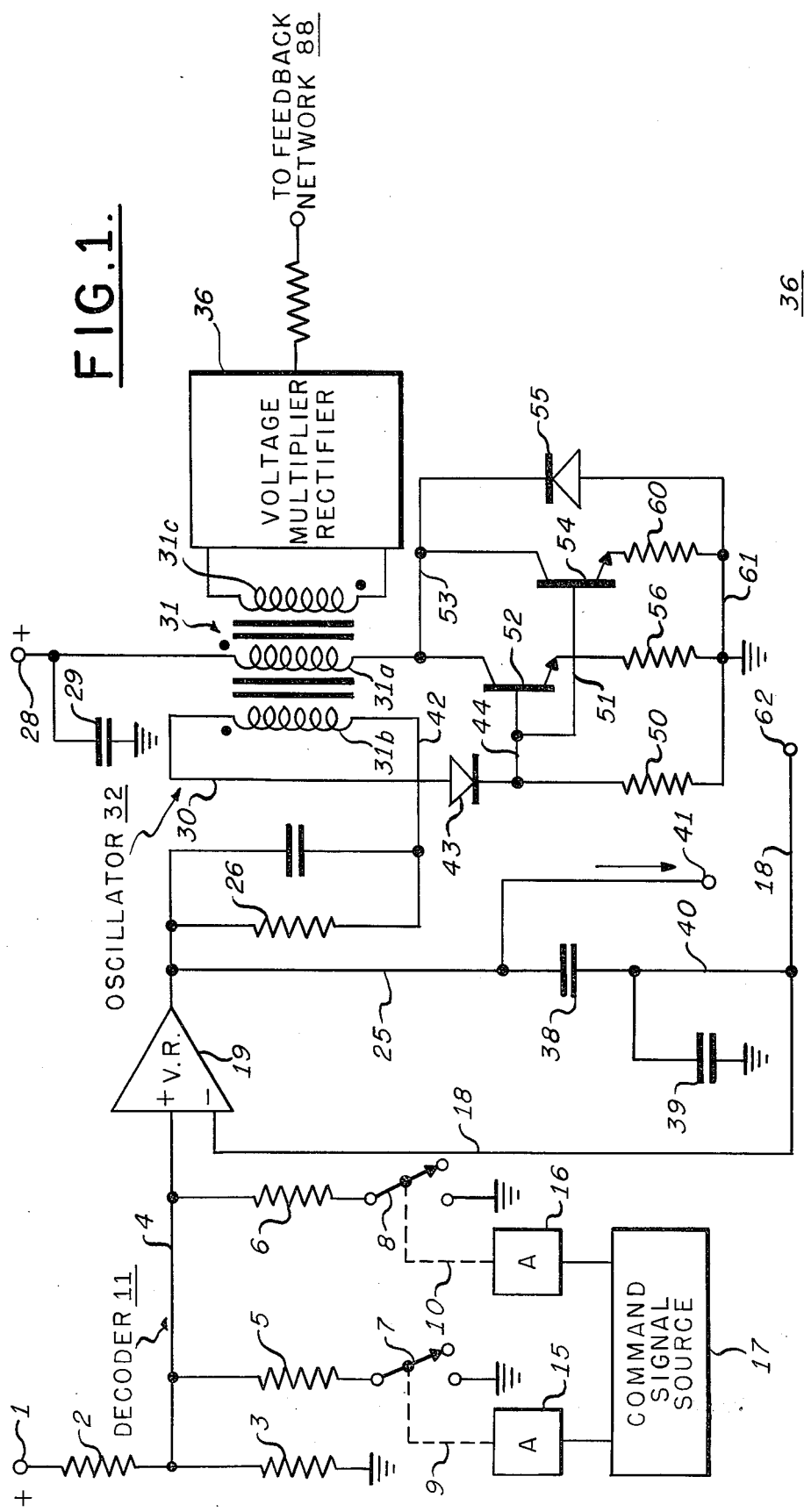
FIG. 1 is a wiring diagram, showing electrical components and their interconnections, of a first portion of the invention.
Figure 2:
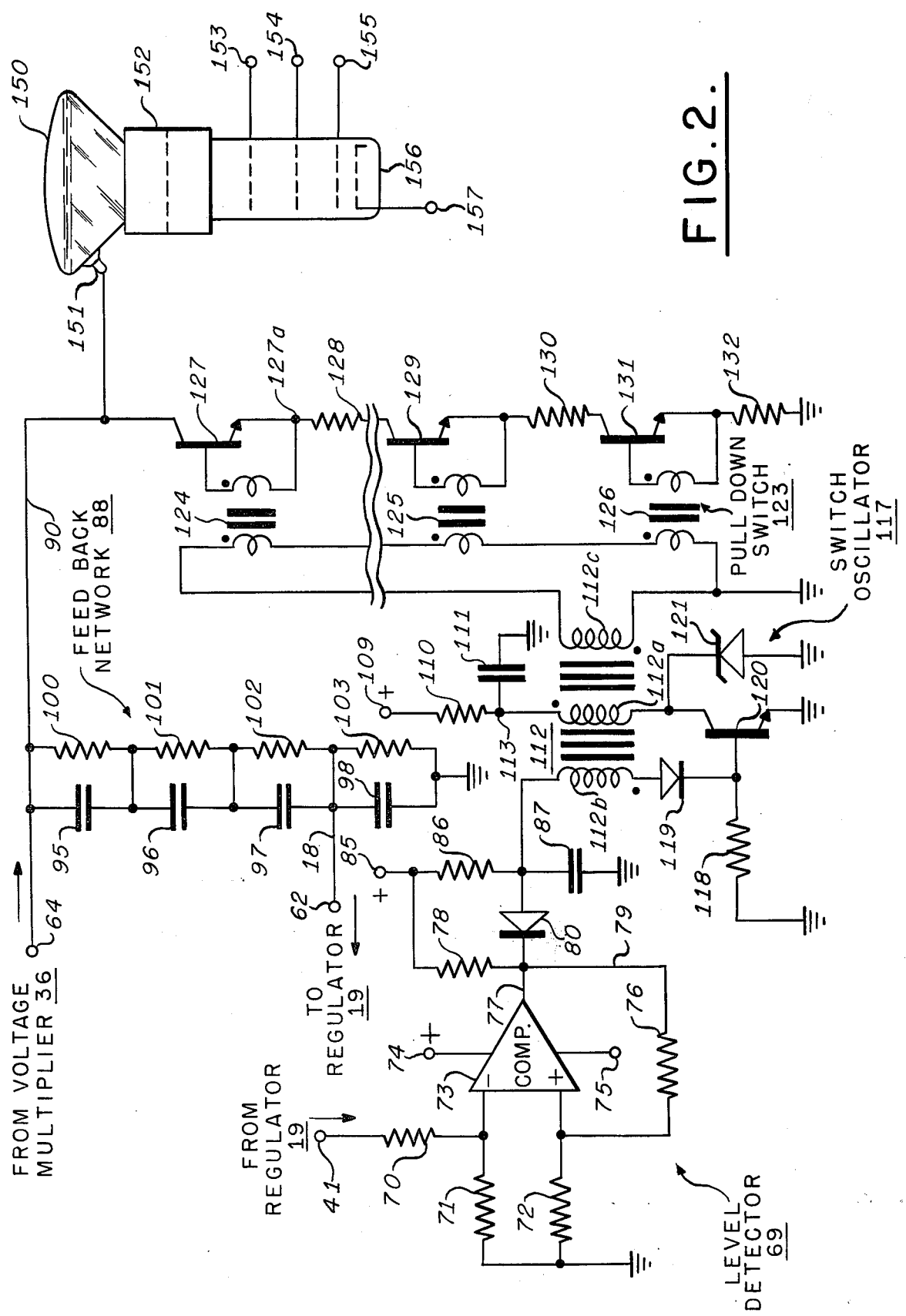
FIG. 2 is a wiring diagram, showing electrical components and their interconnections, of a second portion of the invention cooperating with the circuit of FIG. 1.

The novel power supply for a penetration type of cathode ray color display tube is illustrated in FIGS. 1 and 2. Particularly with respect to FIG. 1, the color signal to be selected is determined by the input to a conventional voltage comparing regulator 19 by a decoder system 11, for example, which may supply one input to the regulator. This input is supplied to regulator 19 by a conventional switching circuit or decoder 11 illustrated in a schematic manner in the figure. A steady voltage is supplied from a conventional source (not shown) at terminal 1 of the voltage divider formed by the series resistors 2 and 3 to lead 4. The effective voltage divider 2, 3 is selectively changed by a conventional command signal source 17 which may be a conventional manual switching matrix or a computer output whose exact nature forms no essential part of this invention. Source 17 operates actuators 15, 16 and links 9, 10, which respectively operate switches 7, 8, respectively located in series with resistors 5, 6 disposed in parallel with resistor 3. In this manner, the voltage level on lead 4 is selectable at any of three or more levels, for example. It will be obvious to those skilled in the art that the mechanical switching combinations of actuators, links, and switches may readily be replaced by electronic switches such as semiconductor devices, and that the mechanical equivalents are shown merely as a matter of convenience and clarity. Ultimately, the voltage level at the input of regulator 19 determines the color generated by the phosphor of the cathode ray tube 150. In one instance, a green trace is created when only resistor 3 is in circuit, yellow when resistor 5 is added, and red when resistor 6 is connected into the circuit. A second input to regulator 19 is coupled to it via a feed back lead 18, as will be further dicussed. An output of voltage regulator 19 is also supplied via leads 20, 25 and terminal 41 to a level detecting circuit 69 shown in FIG. 2, which also remains to be discussed.

The output of regulator 19 is also coupled by leads 20 and 42 through the paralleled resistor 26 and capacitor 27 to one end of a feed back winding 31b of a blocking oscillator transformer 31 whose tertiary winding 31c supplies an input substantially sinusoidal voltage to voltage multiplier 36. The primary winding 31a of transformer 31 of blocking oscillator 32 is fed from a conventional d.c. power supply (not shown) coupled at terminal 28, which terminal is also coupled by filter capacitor 29 to ground. The opposite ends of the primary and secondary windings 31a and 31b are coupled via leads 30 and 53 through a conventional blocking oscillator amplifying and wave shaping circuit. In this circuit, the emitter-to-collector paths of two parallel transistors 52, 54 are coupled between lead 53 of winding 31a and the respective resistors 56, 60 to the grounded lead 61, the two parallel circuits being shunted, in turn, by a protective diode 55. In series with lead 30 of feed back winding 31b is a diode 43 whose opposite electrode is coupled by leads 44 and 51 to the bases of transistors 52, 54 and also via resistor 50 to ground; it serves to protect the bare emitter junctions of transistors 52, 54. Diodes 43, 55 and the windings of blocking oscillator transformer 31 are poled as indicated in FIG. 1.

When power is applied or a higher output voltage on lead 90 is commanded by the decoder signal on lead 4, the regulator (19) voltage on lead 20 rapidly rises. This event drives transistors 52, 54 into conduction and, as these transistors turn on, the increasing voltage is dropped across the primary of transformer 31. This voltage is coupled to the feed back winding 31b in the polarity indicated, causing an increase in the drive for transistors 52, 54. As the primary transformer current tries to increase, the voltage on lead 53 rises and a net decrease in the voltage across the primary of transformer 31 is produced. This, in turn, is coupled to the bases of the transistors and turns them off. As the voltage commanded by decoder 11 on lead 4 is approached on lead 18, the output voltage on lead 20 falls to a level to just support the required drive to oscillator 32 to maintain the commanded voltage level.

Thus, oscillator 32 is basically a blocking oscillator that is allowed to run as fast as the resonance of transformer 31 will permit. Capacitor 38 provides loop compensation for loop stability. Capacitor 39 trims the R-C divider-feed back network 88 to assure that it has frequency insensitive characteristics. Resistors 50 and 26 form a voltage divider preventing over-drive of transistors 52, 54.

Figure 3:
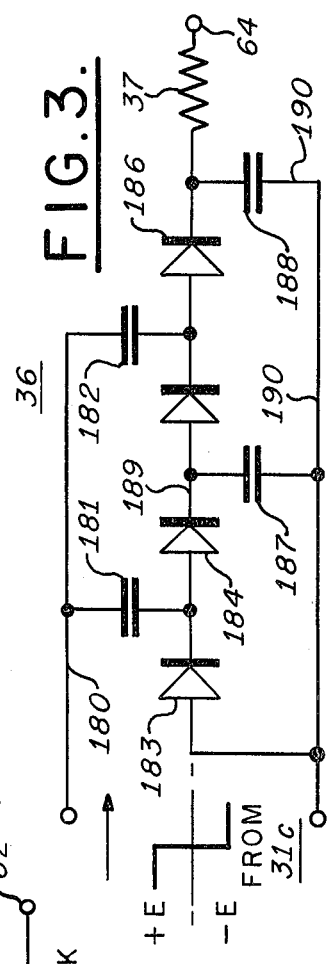
FIG. 3 is a wiring diagram of the voltage multiplier rectifier of FIG. 2.

Accordingly, the square wave output of oscillator 32 is coupled to voltage mutliplier-rectifier 36. Voltage multiplier 36 may be any known type of alternating voltage amplitude multiplying circuit, such as a generally conventional four-stage parallel capacitor voltage multiplier driven by the non-saturating high voltage transformer 31 at 75 KHz, for example, for producing essentially sinusoidal oscillations at the transformer 31 resonance. Oscillator 32 and voltage multiplier 36 together cooperate to form in effect a d.c. to d.c. supply transformer. This arrangement reduces power dissipation and enhances efficiency at all anode voltages and loads, an achievement of significance especially for use in airborne displays. FIG. 3 illustrates one form of voltage multiplier 36 which may be used because the effective output capacitance, consisting of the load capacitance plus the feed back network capacitance, can be discharged to three quarters of its original voltage without tapping any substantial amount of energy stored in the rest of the multiplier circuit. In FIG. 3, the output from winding 31c is coupled at 180 across parallel capacitors 181, 182 connected respective between diodes 183, 184 and 185, 186 of a series output circuit including resistor 37 of FIG. 1. The circuit further includes parallel capacitors 187, 188 coupled between diodes 184, 185 and diode 186 and resistor 37, capacitors 187, 188 being shunt coupled to the grounded conductor 190. Thus, a minimum of power is required to hold a given output voltage at terminal 64. Accordingly, the high voltage output of the recitifying voltage multiplier 36 is coupled through resistor 37 and terminal 64 to the high voltage anode lead 90 of the cathode ray display tube.

In FIG. 2, a sample of the high anode voltage on lead 90 is developed by placing the latter across the R-C feedback network 88 composed of a series of equal capacitors 95, 96, 97 and a final grounded capacitor 98 whose capacitance is about a thousand times that of capacitor 97, for instance. Network 88 is additionally composed of a series of equal resistors 100, 101, 102 and a final grounded resistor 103 whose resistance is about a thousandth of resistor 102, for example. Each of the series of junctions between capacitors 95, 96, 97, 98 is joined directly to the series of respective junctions between resistors 100, 101, 102, 103, thereby preserving the same R-C product for each. The conductor 18 coupled between capacitors 97, 98 provides a low voltage signal representative of the amplitude of the high voltage level on lead 90 via terminal 62 to the second input of regulator 19 in FIG. 1. Thus, the high anode voltage on lead 90 is sampled by the temperature stable frequency compensated feed back network 88 and is provided by lead 18 to regulator 19 for comparison therein with the level of the color command signal generated by decoder 11, and the difference is fed as an amplified error signal via leads 20 and 25 to the respective power oscillator 32 and level detector 69. Positive or pull-up changes in the high anode voltage are implemented by the action of the command signal on lead 4 and the fed back signal on lead 18 in directly charging anode lead 90 through voltage multiplier terminal 64. The pull-up action is efficiently provided at the required high rate because of the selection of high frequency oscillator 32 and the responsive voltage multiplier 36. Thus, in accordance with the present invention, the requirement for a bulky, heavy, and expensive pull-up switching network (similar to pull-down switching network 123) as taught by the prior art is eliminated.

A second path from the high voltage lead 90 to ground is formed by a switching and control circuit which will be referred to herein as a pull down switch 123 and which is controlled by a circuit combination found in the bottom half of FIG. 2. The output of regulator 19 on terminal 41 in FIG. 1 is coupled in FIG. 2 through resistor 70 between a first input of an amplifier 73 connected in a conventional manner as a comparator and one end of a first grounded resistor 71. The output lead 77 of comparator 73, to which is coupled the usual operating voltages at terminals 74, 75 is coupled by resistor 76 between a second input of amplifier 73 and one end of a second grounded resistor 72. The output 77 of comparator 73 is coupled through a diode 80, poled as shown, to one end of a feed back winding 112b of a second or keyed blocking oscillator transformer 112. An operating potential from a suitable source (not shown) is coupled at terminal 85 through resistor 78 to lead 77 on one side of diode 80 and also through resistor 86 to the opposite pole of diode 80 which is also coupled to ground via capacitor 87.

Still referring to FIGS. 1 and 2, when the output of regulator 19 on lead 20 goes low, signalling that a lower voltage is required on lead 90, the output on lead 77 of comparator 73 goes up, back-biasing diode 80 and causing capacitor 87 to be charged from voltage source 85 through resistor 86 until the base emitter of transistor 120 and diode 119 become forward biased. Operation of the circuit is generally similar to that of oscillator 32, with the voltage on capacitor 87 being the driving voltage. In FIG. 2, resistor 110 is a current limiting resistor and forms a filter with capacitor 111. Diode 119 protects the transistor (120) base emitter from large reverse voltages. The Zener diode 121 serves to protect transistor 120 from over-voltages and it limits the reverse voltage across transformer 112.

Opposite the input end of primary winding 122b, that winding is coupled through diode 119, poled as shown, and resistor 118 to ground. The primary winding 112b is supplied with a suitable positive voltage from terminal 109 through resistor 110, a common junction 113 being coupled by a filter capacitor 111 to ground. At the opposite end of primary 112b are connected in parallel to ground a transistor 120 and a protective Zener diode 121, poled as shown; transistor 120 is controlled by a voltage obtained at the common junction between diode 119 and resistor 118. The switching blocking oscillator 117 thus formed is completed by the tertiary or output winding 112c of transformer 112 and is essentially conventional in operation; known circuits other than those specific circuits illustrated may be used as the blocking oscillators 32 or 117.

The purpose of the switch oscillator 117 is to control the operation of pull down switch 123; the output winding 112c of its transformer 112 is connected via lead 122 across a series of one-turn input windings of one-to-one ferrite core transformers 124, ..., 125, 126. There may be, for example, twenty such transformers, each having one-turn primaries and one-turn secondaries. The pull down switch 123 is completed by the series connected transistors 127, ... 129, 131 between which are interposed an equal number of series connected resistors 128, ..., 130, 132 connected between the high voltage anodes lead 90 and ground. There will be twenty transistors and twenty resistors if twenty of the miniature transformers 124 et cetera are employed. The emitter to collector paths of the several transistors are each connected in series with the several resistors. Each transistor has its base electrode connected through the secondary of a transformer to a junction between the transformer winding and the next succeeding series resistor. For example, transistor 127 has its base electrode connected through the secondary of transformer 124 and the junction 127a between the emitter of transistor 127 and resistor 128, et cetera. The transistors may be NPN silicon power transistors of the MJE 12007 type made by Motorola Semiconductors of Phoenix, Ariz.

Negative transitions of the high anode voltages, when commanded at decoder 11, are accomplished through the action of pull down switch 123. The stacked plurality of high voltage switching transistors 127, ..., 129, 131, et cetera, provides a stand-off voltage of 18 kilovolts, for example. The transformers 124, ..., 125, 126, et cetera, connected between bases and emitters, drive each respective transistor simultaneously. The transformers are conventional devices, but are selected not only to ensure the necessary high unidirectional voltage isolation between the individual transistors of the stack and switching oscillator 117, but also are designed to cause rapid switching of the transistors. The components of switches of this type are usually potted assemblies due to the very high voltage involved and are relatively massive and comprise a relatively large component of the overall power supply assembly. When the output of regulator 19 changes polarity, i.e., goes negative, indicating that a lower anode voltage is required, level detector 69 gates switch oscillator 117 on, rendering the pull down switch 123 intermittently conductive. At the same time, power oscillator 32 is disabled through diode 43. As the anode voltage on lead 90 falls to the commanded level, the output of regulator 19 smoothly returns to normal. Power oscillator 32 comes back into operation and the level detector 69 turns off switch oscillator 117. In this manner, a closed loop, tightly regulating switching high-voltage supply is provided.

The output anode voltage may be coupled from lead 90 to a conventional acceleration electrode 151 of the cathode ray tube 150. Tube 150 may include a cathode fed with video signals at terminal 157, at least one prefocusing or control grid coupled to terminal 155, which may be at ground potential, and a focusing electrode coupled to terminal 154, all operated in the usual manner. An accelerating electrode of cylinder form may be coupled at terminal 153 to lead 90 in lieu of the frustrated conical electrode coupled to terminal 151.

The novel high anode voltage supply, because of its high frequency converter operation, maintains only a low level output ripple with minimum capcitance and stored energy. As a consequence, the switching operation requires relatively low power consumption and offers a lesser chance of arcing conditions and consequent damage. The energy stored in the voltage multiplier after operation is established is never lost during color changes thereby eliminating the requirement of another power absorbing, massive and expensive switching assembly similar to pull-down switch 123 for pull-up purposes. In one example, color switching speeds of 200 microseconds for a full 8 kilovolt anode voltage swing were achieved, with tolerable power dissipation at repetition rates up to 120 Hz. The output anode voltage was regulated to 0.5 percent or less, and the ripple never exceeding 0.1 percent peak at any anode voltage level. The power supply is characterized by reduced parts count, size, and complexity, as well as expense and increased reliability. Reliability is improved also because there are no active elements in the high anode voltage line.

While the invention has been described in its preferred embodiments, it is to be understood that the words which have been used are words of description rather than of limitation and that changes may be made within the purview of the appended claims without departing from the true scope and spirit of the invention in its broader aspects.

What is claimed is:

1. A switching high voltage power supply for supplying a plurality of varible d.c. voltages to the anode of a penetration type color cathode ray tube display apparatus comprising:

selector means for sequentially selecting one of a plurality of predetermined d.c. command signals corresponding to an intial value of said anode voltage to values of decreasing amplitudes dependent upon the colors of the information to be displayed, voltage regulator means responsive to said command signal and said anode voltage for providing a d.c. error signal, d.c. to d.c. converter means including blocking oscillator means responsive to said error signal and an energy storing voltage multiplier rectifier means responsive to said blocking oscillator for supplying said d.c. anode voltage corresponding to said initial value, level detector means responsive to a change of polarity of said error signal, and means including pull-down switch means responsive to said level detector means for reducing said anode voltage to the value corresponding to said error signal, the energy stored in said voltage multiplying rectifier means substantially reestablishing said initial anode voltage upon completion of said selector means sequence.

2. The apparatus as set forth in claim 1 wherein said blocking oscillator includes means responsive to said error signal for disabling said blocking oscillator upon a change in polarity thereof.

3. The apparatus as set forth in claim 2 wherein said energy storing voltage multiplying means comprises a plurality of multiplying stages each stage comprising rectifier and capacitor means connected with the output of said blocking oscillator means.

4. The apparatus as set forth in claim 3 wherein the number of said plurality of stages is dependent upon the number of said plurality of anode voltages.

5. The apparatus as set forth in claim 3 wherein said pull-down switch means includes:

a plurality of series connected resistor means between said anode and ground and a corresponding plurality of switch means rendering said resistor means effective, and wherein said means responsive to said level detector means includes, switch oscillator means responsive to said level detector means for energizing said switch means for rendering said resistor means effective.

* * * * *